United States Patent [19]

Hoenigmann

[11] Patent Number: 5,064,893

[45] Date of Patent: Nov. 12, 1991

[54] FLEXIBLE LABEL FILM FROM POLYETHYLENE AND CALCIUM CARBONATE-POLYMER MIXTURE

[75] Inventor: Martin F. Hoenigmann, Dover, Del.

[73] Assignee: Rexene Corporation, Dallas, Tex.

[21] Appl. No.: 490,410

[22] Filed: Mar. 8, 1990

[51] Int. Cl.$^5$ .......................... C08L 23/06; C08K 3/26
[52] U.S. Cl. ...................................... 524/427; 524/528
[58] Field of Search ........................ 525/427, 425, 528

[56] References Cited

U.S. PATENT DOCUMENTS

| | | | |
|---|---|---|---|
| 4,587,303 | 5/1986 | Turtle | 525/240 |
| 4,657,982 | 4/1987 | Breck | 525/240 |
| 4,803,231 | 2/1989 | Seinerg | 523/219 |
| 4,911,985 | 3/1990 | Jenkins | 428/446 |

*Primary Examiner*—Christopher Henderson
*Attorney, Agent, or Firm*—Harold E. Meier

[57] ABSTRACT

Polyethylene films having improved diecutability and compositions for the production thereof comprise from approximately 75% to about 95% of a polyethylene polymer and from about 5% to about 25% of a calcium carbonate filler. Preferably, the calcium carbonate filler comprises polybutylene and solid calcium carbonate having a particle size less than about 3.0 microns. The film produced from the composition is from approximately 1 mil to about 10 mils in thickness. The film can be produced using conventional blown film technology and equipment and has improved diecutability and printability. Thus, the film is readily adaptable to the production of diecut labels.

8 Claims, No Drawings

FLEXIBLE LABEL FILM FROM POLYETHYLENE AND CALCIUM CARBONATE-POLYMER MIXTURE

TECHNICAL FIELD

This invention relates to films that are made from a blend of polyethylene and a calcium carbonate filler. The films are uniquely adapted to be used in the production of diecutable labels.

BACKGROUND OF THE INVENTION

Polyethylene films are used in the manufacture of a wide variety of products ranging from stretch/cling applications such as pallet wraps, grocery bags, diaper liners, household food wraps, and agricultural films. A need has arisen, however, for a film that may be diecut to produce labels. A diecutable polyethylene film preferably has lower elongation and ultimate tensile properties than conventional polyethylene films. Thus, the tensile and elongation properties of a polyethylene film that is to be diecut into labels must be substantially reduced. Moreover, it is highly desirable that the reduction in strength and elastic properties be accomplished without adversely affecting the processability of the film.

SUMMARY OF THE INVENTION

The present invention provides a polyethylene film composition and a polyethylene film that is readily diecutable. The diecutable property of the films of the present invention is achieved by reducing the elongation and ultimate tensile properties of the film. Additionally, the film composition of the present invention may be readily processed into a diecutable film using conventional blown film technology and equipment.

The invention described herein is a polyethylene film formed from a blend of: (1) from about 75% to about 95% of a medium density polyethylene; and (2) from about 5% to about 25% calcium carbonate filler.

The calcium carbonate filler is a blend of solid calcium carbonate with a compatible polymer such as polybutylene. The film is from approximately 1 mil to about 10 mils in thickness.

DETAILED DESCRIPTION

The present invention relates to a film composition and film that is formed from a blend of polyethylene and a filler concentrate containing calcium carbonate. The film composition of the present invention includes from about 75% to about 95% polyethylene and from about 5% to 25% of a filler concentrate containing calcium carbonate. The calcium carbonate should be uniformly and widely disbursed in the film of the present invention; therefore, it is desirable that the calcium carbonate in the filler concentrate have a small uniform particle size. Preferably the size of the solid calcium carbonate is on the order of 3.0 microns.

The calcium carbonate filler concentrate also contains a base polymer. The preferred base polymer is polybutylene, but it is contemplated that other polymers such as polyethylene could be used as the base. A preferred filler concentrate contains approximately 80% calcium carbonate and 20% polybutylene and has a nominal melt index of from about 0.5 to about 1.5 gms/10 min (190° C., 2160 gms) and a nominal melt flow of from about 1.0 to about 3.0 gms/10 min (230° C., 2160 gms). This material is available from Southwest Chemical Services of Houston, Tex. under the Trade Designation 1924 PBC.

It is contemplated that any low or medium density polyethylene suitable for the production of thin films may be used to produce the film of the present invention. A preferred polyethylene homopolymer has a density of about 0.930 and a melt index from about 1.5 gms/10 min as measured by ASTM method D 1238. This polyethylene is commercially available from Rexene Products Company of Odessa, Tex. under the Trade Designation 1078 BN.

The diecutable films of the present invention may be produced with conventional blown-film extrusion technology and equipment. The blown-film extrusion process is discussed on pages 50-59 of the U.S. Industrial Chemicals Processing Guide, 4th Ed. In the production of the film of the present invention, it is preferable to maintain a diegap of from about 0.05 inches to about 0.1 inches with a blow-up ratio of from about 1.5 to about 2.0.

EXAMPLE 1

A diecutable polyethylene film of the present invention is made from a blend of 75% by weight Rexene 1078 BN and about 25% by weight Southwest 1924. The equipment used to produce the film of the present invention is conventional blown-film extrusion processing equipment. The polyethylene film produced has a gauge of approximately 3.5 mils. In order to determine the diecutability of the film, the ultimate tensile and elongation of the film were measured using an Instron model 1130 test machine. The ultimate tensile and elongation were determined in accordance with ASTM method D 882. The results of the test were recorded with an Instron chart recorder using chart paper No. 3710027. A six inch by six inch square of the chart paper used weighs approximately 1.10 gms.

It has been determined that a reliable indicator of the diecutability of a film is provided by the weight of the chart paper bounded by the vertical and horizontal axis and the curve established by the foregoing test (weight under curve). Preferably, the weight of the paper under the curve is less than about 0.30 gms. Therefore, the paper under the curve was cut out and weighed in order to determine the diecutability of the film of this example. Average test results including the weight of the paper under the curve, are set forth in Table 1 below.

EXAMPLE 2

A film of the present invention was prepared with a blend of 85% Rexene 1078 BN and 15% Southwest 1924. The film was produced and tested in accordance with Example 1 and average test results are set forth in Table 1 below.

EXAMPLE 3

A film of the present invention was prepared with a blend of 95% Rexene 1078 BN and 5% Southwest 1924. The film was produced and tested in accordance with Example 1 and average test results are set forth in Table 1 below.

COMPARATIVE EXAMPLE

A polyethylene film was produced and tested in accordance with the method of Example 1. The film was produced from 100% Rexene 1078 BN. Average test results are set forth in Table 1 below.

TABLE 1

| | Yield (p.s.i.) | Tensile (p.s.i.) (At Break) | Elongation (%) | Weight under Curve (gms) |
|---|---|---|---|---|
| Machine Direction | | | | |
| Example No. | | | | |
| 1 | 1428.57 | 2212.48 | 507.70 | .239 |
| 2 | 1428.57 | 2221.81 | 512.83 | .261 |
| 3 | 1619.05 | 2473.91 | 617.57 | .317 |
| Comparative Example | 1619.05 | 2388.95 | 640.63 | .307 |
| Transverse Direction | | | | |
| Example No. | | | | |
| 1 | 1428.57 | 1819.48 | 270.67 | .104 |
| 2 | 1380.95 | 1785.62 | 432.77 | .158 |
| 3 | 1523.81 | 2008.09 | 768.63 | .323 |
| Comparative Example | 1666.67 | 2004.48 | 857.73 | .348 |

As can be seen from the foregoing examples and Table 1, the addition of the calcium carbonate filler material to the polyethylene results in the production of a film with reduced yield, tensile and elongation properties. Also, as can be observed from Table 1, the weight of the chart paper under the curve decreases as the percentage of calcium carbonate filler is increased. The decrease in the weight under the curve measurement indicates improved diecutability. Preferably, the weight under the curve measurement is less than 0.30 gms in order to insure acceptable diecutability.

While the particular embodiments of the present invention have been described, it will be apparent to those skilled in the art that various changes and modifications can be made without departing from the spirit and scope of the invention. The following claims are intended to cover all such modifications that are within the scope of this invention.

I claim:

1. A film composition comprising:
   from about 75% to about 95% by weight of a polyethylene polymer suitable for the production of thin film;
   said polyethylene polymer having a density of from about 0.910 to about 0.930 and a melt index of from about 1.0 gm/10 minutes to about 3.0 gm/10 minutes;
   from about 5% to about 25% of a calcium carbonate filler, said filler comprising finely ground solid calcium carbonate admixed with at least one polymer prior to mixing with said polyethylene polymer;
   said filler having a melt index of from about 0.5 gm/10 min to about 1.5 gm/10 minutes and a melt flow of from about 1.0 gm/10 minutes to about 3.0 gm/10 minutes;
   said film having a yield tensile strength in the machine direction of from about 1350 p.s.i. to about 1500 p.s.i., a yield tensile strength in the transverse direction of from about 1300 to about 1500 p.s.i., a break tensile strength in the machine direction of from about 2100 p.s.i. to about 2300 p.s.i., a break tensile strength in the transverse direction of from about 1700 p.s.i. to about 1900 p.s.i., ultimate elongation in the machine direction of from about 450% to about 550% and ultimate elongation in the transverse direction of from about 250% to about 450%.

2. The composition of claim 1 wherein the particle size of the calcium carbonate is less than about 3.0 microns.

3. The composition of claim 1 wherein the calcium carbonate filler comprises solid calcium carbonate and polybutylene.

4. A diecutable film, said film comprising:
   from about 75% to about 95% of a polyethylene polymer suitable for the production of thin films;
   said polyethylene polymer having a density of from about 0.910 to about 0.930 and a melt index of from about 1.0 gm/10 minutes to about 3.0 gm/10 minutes;
   a calcium carbonate filler, said filler comprising finely ground solid calcium carbonate admixed with at least one polymer prior to mixing with said polyethylene polymer;
   said filler having a melt index of from about 0.5 gm/10 min to about 1.5 gm/10 minutes and a melt flow of from about 1.0 gm/10 minutes to about 3.0 gm/10 minutes;
   said film having a yield tensile strength in the machine direction of from about 1350 p.s.i to about 1500 p.s.i., a yield tensile strength in the transverse direction of from about 1300 p.s.i. to about 1500 p.s.i., a break tensile strength in the machine direction of from about 2100 p.s.i. to about 2300 p.s.i., a break tensile strength in the transverse direction of from about 1700 p.s.i. to about 1900 p.s.i., ultimate elongation in the machine direction of from about 450% to about 550% and ultimate elongation in the transverse direction of from about 250% to about 450%.

5. The film of claim 4 wherein the particle size of the calcium carbonate is less than about 3.0 microns.

6. The film of claim 4 wherein the calcium carbonate filler comprises solid calcium carbonate and polybutylene.

7. The film of claim 4 wherein a film is from about 1 mil to about 10 mils in thickness.

8. A diecutable film, said film comprising:
   from about 75 % to about 95 % of a polyethylene polymer suitable for the production of thin films;
   said polyethylene polymer having a density of from about 0.910 to about 0.930 and a melt index of from about 1.0 gm/10 minutes to about 3.0 gm/10 minutes;
   a calcium carbonate filler, said filler comprising finely ground solid calcium carbonate having a particle size less than about 3.0 microns admixed with polybutylene prior to mixing with said polyethylene polymer;
   said filler having a melt index of from about 0.5 gm/10 min to about 1.5 gm/10 minutes and a melt flow of from about 1.0 gm/10 minutes to about 3.0 gm/10 minutes;
   said film having a yield tensile strength in the machine direction of from about 1350 p.s.i. to about 1500 p.s.i., a yield tensile strength in the transverse direction of from about 1300 p.s.i. to about 1500 p.s.i., a break tensile strength in the machine direction of from about 2100 p.s.i. to about 2300 p.s.i., a break tensile strength in the transverse direction of from about 1700 p.s.i. to about 1900 p.s.i., ultimate elongation in the machine direction of from about 450% to about 550% and ultimate elongation in the transverse direction of from about 250% to about 450%.
   said film having a thickness of from about 1.0 mil to about 10 mils.

* * * * *